United States Patent [19]

Weber

[11] Patent Number: 5,189,766

[45] Date of Patent: Mar. 2, 1993

[54] MULTIPLE BIT HEIGHT SNAP FIT CABLE HOLDER APPARATUS

[75] Inventor: William F. Weber, Allen, Tex.

[73] Assignee: Alcatel Network Systems, Inc., Richardson, Tex.

[21] Appl. No.: 829,121

[22] Filed: Jan. 31, 1992

[51] Int. Cl.$^5$ ............................................. A44B 17/00
[52] U.S. Cl. ....................................... 24/459; 24/453; 411/457; 411/920; 403/4; 248/73
[58] Field of Search ................... 24/459, 458, 455, 530, 24/536, 541, 572; 248/73; 16/2; 403/3, 4; 411/920, 457

[56] References Cited

U.S. PATENT DOCUMENTS

| | | | |
|---|---|---|---|
| 1,073,416 | 9/1913 | Giller et al. | 411/457 |
| 1,478,932 | 12/1923 | Wetz et al. | 411/457 |
| 1,801,850 | 4/1931 | Erwin | 411/457 |
| 1,925,488 | 9/1933 | Kern | 248/73 |
| 2,275,683 | 3/1942 | Rutledge | 24/453 |
| 2,779,987 | 2/1957 | Jordan | 24/459 |
| 3,042,352 | 7/1962 | Stamper | 248/73 |
| 3,562,847 | 2/1971 | Jemison | 16/2 |
| 5,018,253 | 5/1991 | Oppenheimer | 24/459 |

FOREIGN PATENT DOCUMENTS

| | | | |
|---|---|---|---|
| 0221618 | 6/1962 | Austria | 24/459 |
| 1559036 | 3/1969 | France | 24/459 |
| 0475556 | 11/1937 | United Kingdom | 24/625 |
| 0972731 | 10/1964 | United Kingdom | 24/16 PB |
| 1025169 | 4/1966 | United Kingdom | 248/73 |
| 1340537 | 12/1973 | United Kingdom | 248/73 |

OTHER PUBLICATIONS

Western Electric, Technical Digest No. 32, Oct. 1973; Balls et al. One Page #7.

Primary Examiner—Victor N. Sakran
Attorney, Agent, or Firm—Bruce C. Lutz; Dennis O. Kraft

[57] ABSTRACT

A snap fit cable retainer is illustrated for accommodating multiple diameter cables in a snug fit configuration by having the bit portion between adjacent side legs being closer to the extremities of the legs than is the main bit portion of the overall connector. In this way, large diameter cables can be run lengthwise through the retainer and smaller diameter cables can be run crosswise through the retainer. The retainer can also accommodate a layer of cables in each direction simultaneously by placing the lower level in the crosswise direction through the retainer and the second layer on top in the lengthwise direction.

5 Claims, 3 Drawing Sheets

MULTIPLE BIT HEIGHT SNAP FIT CABLE HOLDER APPARATUS

THE INVENTION

The present invention pertains generally to cable holders and more specifically to a snap fit cable holder. Even more particularly, it relates to a snap fit cable holder with at least four legs which can be used with different size cables in accordance with whether the retainer is placed on the cable so that the cable passes through the retainer in the longitudinal or the transverse direction. This is accomplished by extending the sides down from the top of the retainer so that the two side legs form a bit portion therebetween which is closer to the extremities of the snap fit legs than is the top of the retainer.

BACKGROUND

Snap fit cable holders have been utilized in the past where more than one projection has been formed on one side of the cable holder leg. However, when such a cable holder is used on small diameter cables, there may be an excessive amount of leg projecting through the base which, in some instances, will interfere with other components. Further, such prior art cable connectors have, on occasion, been difficult to insert to the exact depth desired for a given application. In addition, the cable holders using more than one projection on one side of a leg have definite limitations as to incremental spacing depending upon material thickness. In other words, the material thickness needs to be much less than the spacing between clip projections to work properly, and such a limitation is not always compatible with the changes in cable sizes that need to be accommodated.

Prior art retainers have often provided "loose" or bundled retention of cables. It is, however, often desirable, from a neatness or cable tracing standpoint, to have a "snug" fit of cables in a single layer.

The present invention solves the above-mentioned shortcomings of the prior art by providing a retainer which has more vertical clearance for the cables in the longitudinal direction than it does in the transverse direction between the legs on the side of the retainer.

In the above manner, a great variety of cable thicknesses can be accommodated using a single cable connector and merely altering the orientation of cable through the connector, altering whether the holes used coact with the catches on the inside or the outside of the legs and using different supports whose thickness is chosen in accordance with the diameter of cables to be fastened down in a given instance.

It is therefore an object of the present invention to provide a cable connector which can be easily removed from base openings and can provide a snug fit for each of a variety of different cable diameters.

Other objects and advantages of the present invention will be apparent from a reading of the specification and appended claims in conjunction with the drawings wherein:

DETAILED DESCRIPTION

Figure 1:
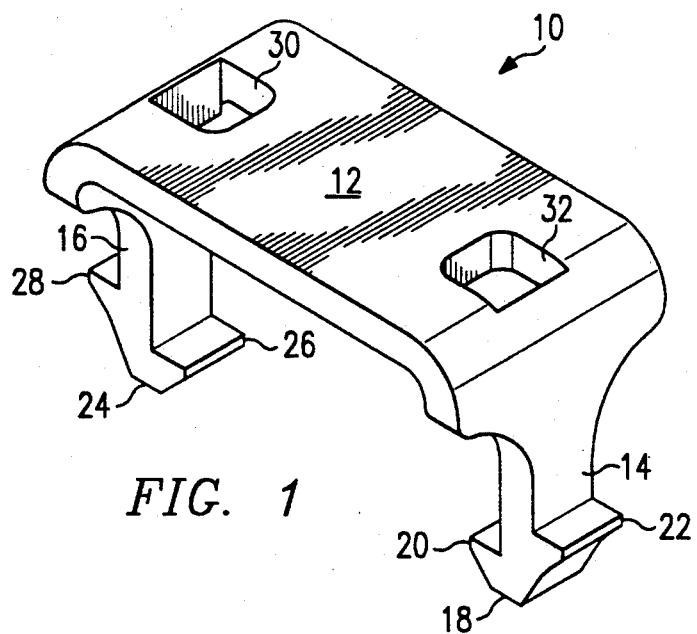
FIG. 1 is isometric view of a two-legged version of the present inventive concept.

In FIG. 1 a U-shaped unitary part 10 for use as a clamp is illustrated with a bit portion 12 and side extensions 14 and 16. The side extension 14 is configured in the form of a leg having an extremity 18 and first and second snap fit projections 20 and 22. Leg 16 has a similar extremity 24 and also snap fit projections 26 and 28. While not required to practice the invention, the device 10 has openings 30 and 32 in the bit portion 12 for use in ease of manufacturing of the inside of the legs 14 and 16. It will be noted that the projections 20 and 26 are a first distance from the bit portion 12 while the projections 22 and 28 are a second and lesser distance from bit portion 12. It may also be noted that the projections 20 and 26 are on the inside of legs 14 and 16 respectively, while the projections 22 and 28 are on the outside of legs 14 and 16.

Figure 2:
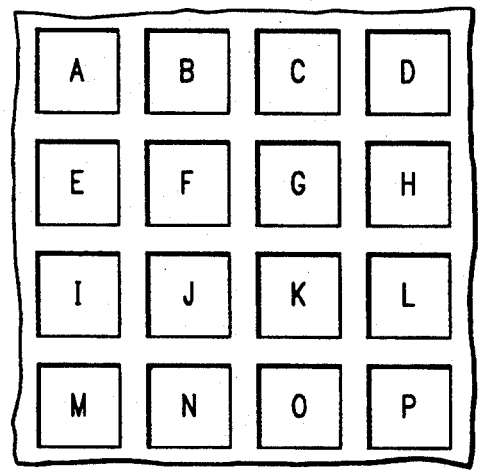
FIG. 2 illustrates a base support including a plurality of openings used in conjunction with the cross-sectional views of a clamp as shown in FIGS. 3 through 6, 8 and 9 to teach the manner in which the clamp is used.

In FIG. 2 a grid of openings in a base support or plate 35 is shown with the openings labeled A through P. This provides a symmetrical grid of square openings for simplicity in design and universal use in various cable support configurations. However, only the openings required for specific application could be formed if so desired. Also, the openings could be circular or of other shapes with appropriate modification of the snap fit projections.

Figure 3:
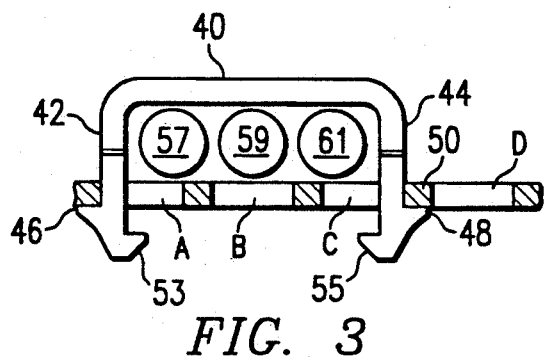
FIG. 3 illustrates an end or cross-sectional view of a clamp mounted in the base of FIG. 2 using outside snap projections of the legs.

In FIG. 3 a side view of the clamp 10 of FIG. 1 is illustrated inserted in a base as shown in FIG. 2. In FIG. 3 a bit portion 40 has legs 42 and 44 with projections 46 and 48 coacting with a plate generally designated as 50. FIG. 3 thus shows the cable clamp inserted in openings A and C with the tabs 46 and 48 coacting with the outside edges or furthermost edges of these two openings. Also shown on the legs 42 and 44 are inside projections 53 and 55. Between bit portion 40 and plate 50 are cables 57, 59 and 61.

Figure 4:
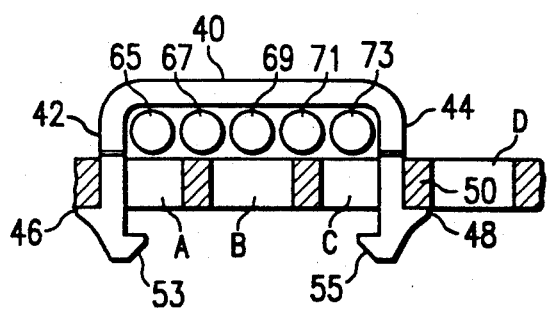
FIG. 4 is an end view of the cable clamp used in the same manner as FIG. 3 except with a thicker base thus properly enclosing smaller diameter cable.

In FIG. 4 the same designations as used in FIG. 3 are used with the exception of the designations for the cables. It will be noted that since the thickness of plate 50 is thicker, the diameter of the cables designated as 65 through 73 are snugly confined while of a smaller diameter.

Figure 5:
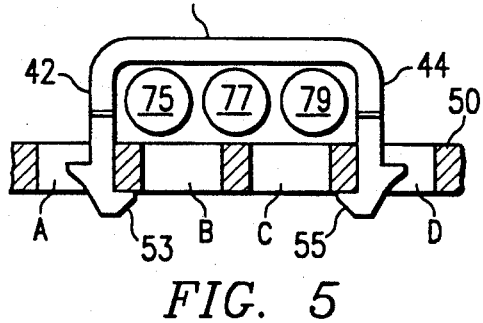
FIG. 5 illustrates an end view of the clamp using the same thickness base material as FIG. 4 but accommodating larger diameter cable since it uses the inside projection of the legs.

In FIG. 5, the inside tabs or projections 53 and 55 are used to provide the snap fit action and are used with openings A and D at their closest or nearest edges as opposed to the farthest edges of the openings when used with the outside projections of FIGS. 3 and 4. Even using the thicker base 50, cables of a diameter similar to that previously used in FIG. 3, may be accommodated.

Figure 6:
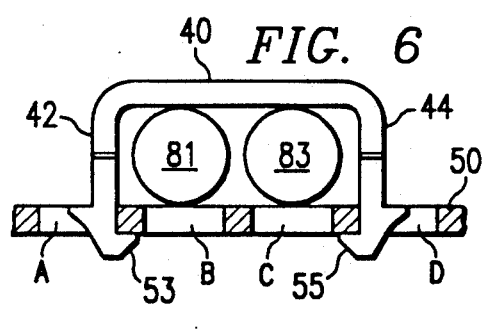
FIG. 6 illustrates a view of the clamp of FIG. 5 using thinner base material thereby accommodating larger diameter cables.

In FIG. 6 a base material of the same thickness as FIG. 3 is used while again using the lower snaps or projections 53 and 55 to allow clamping of much larger cable sizes shown as cables 81 and 83.

Figure 7:
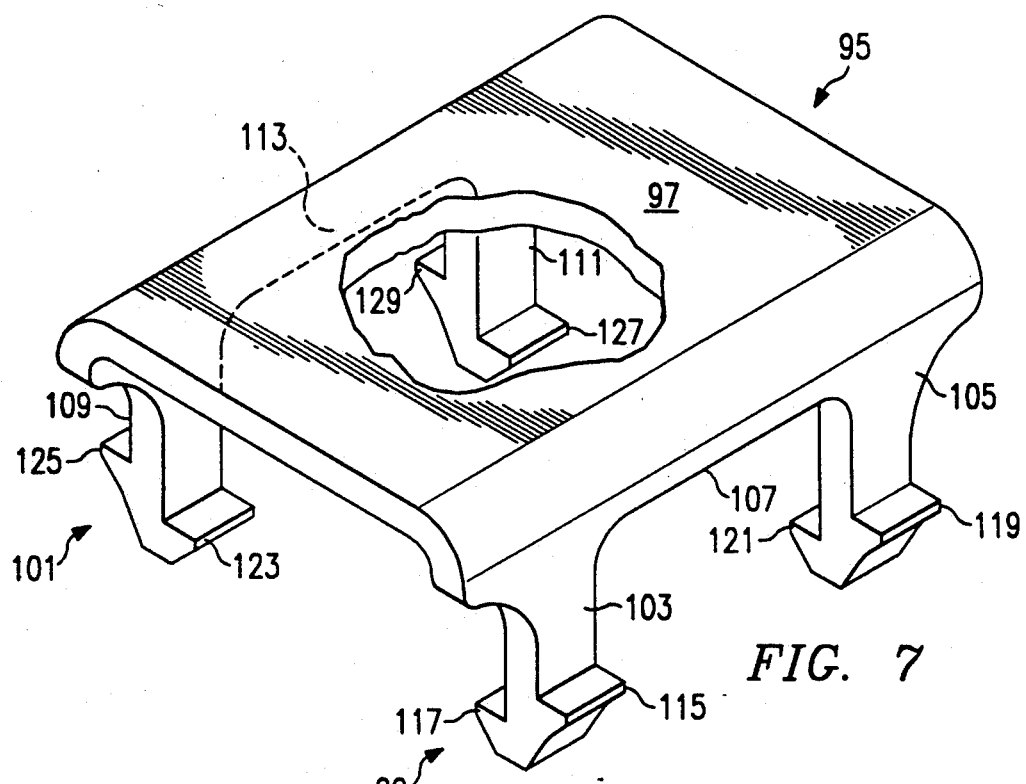
FIG. 7 illustrates a four-legged version of the connector of FIG. 1 wherein cables can be inserted either longitudinally or transversely between the sets of legs to accommodate additional cable heights as illustrated in following FIGS. 8 and 9.

FIG. 7 illustrates a four-legged version of the cable clamp of FIG. 1 which provides even more versatility. In FIG. 7 the entire clamp is designated as 95 with the main bit portion being labeled 97. The bit portion 97 has first and second side extensions 99 and 101. Side extension 99 includes a first leg 103 and a second leg 105. The legs 103 and 105 in combination with a further bit portion 107 define an enclosure for cables in a transverse direction through the clamp 95. Legs or sides 99 and 101, in combination with main bit portion 97, define a longitudinal enclosure or restrictive area for cables mounted in a lengthwise direction through the clamp 95. The side 101 has legs 109 and 111 corresponding to legs 103 and 105 and a further bit portion 113 corresponding to bit portion 107. The leg 103 has an outside projection 115 and an inside snap fit projection 117. The remaining legs have similarly designated inside and outside projections for providing snap fit action.

Figure 11:
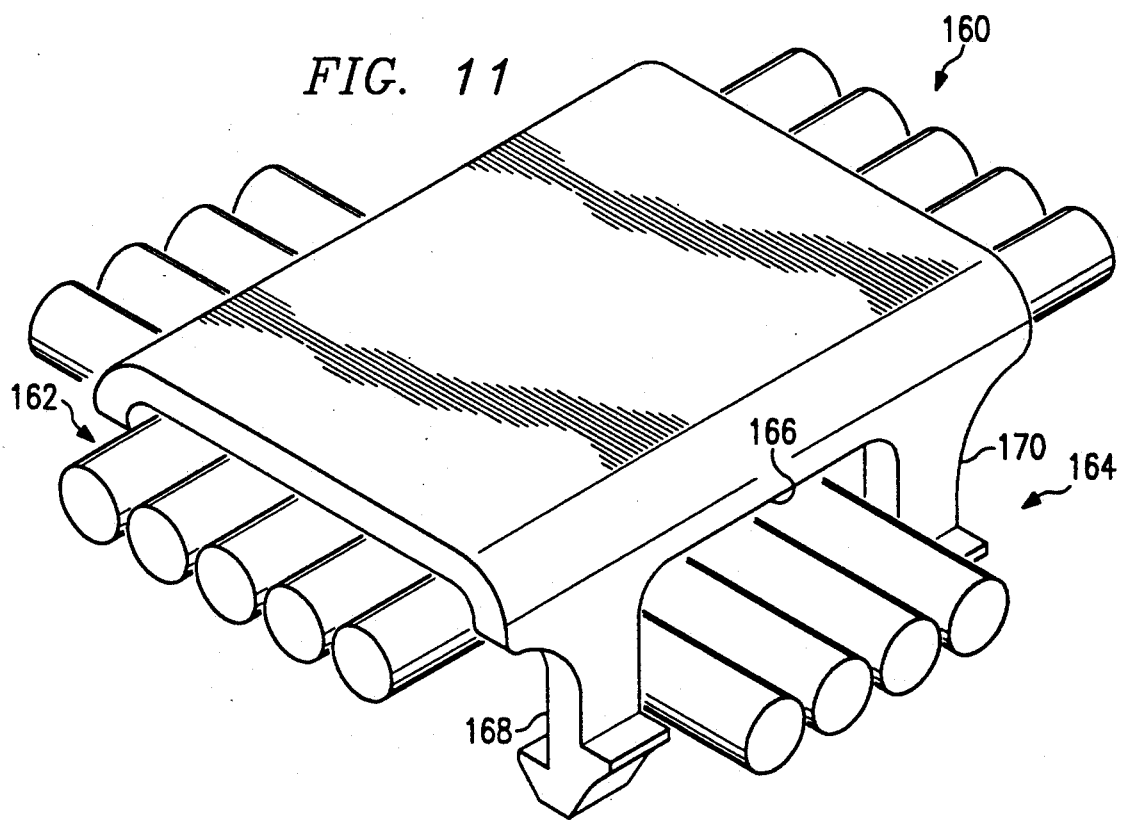
FIG. 11 illustrates in isometric format that the concept of FIG. 7 may be utilized to clamp two sets of cables one orthogonal to the other with the top layer being in the longitudinal orientation of the clamp.

From the above it will be apparent that the clamp of FIG. 7 can be used to clamp cables passing through in the longitudinal direction as well as the transverse direction and in fact, can be used to clamp cables running in both directions simultaneously as will be observed from FIG. 11.

Figure 8:
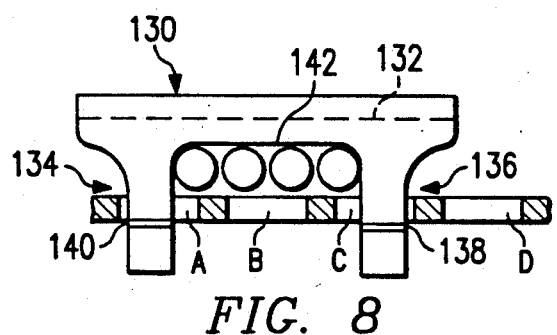
FIG. 8 illustrates a side view of the clamp of FIG. 3 with smaller diameter cables held under the clamp in a transverse direction as compared to those cables of FIG. 3.

It will be realized that FIGS. 3 through 6 depict not only an end view of FIG. 1 but an end view of FIG. 7. FIG. 8 illustrates a side view of the four-legged device of FIG. 7. In FIG. 8 a main bit portion 130 is shown with a dash line 132 showing the inside or underside of main bit portion 130. Main bit portion 130 corresponds to bit portion 40 of FIG. 3 if representing FIG. 7. The legs such as 134 and 136 are illustrated with outside or upper snap catches 138 and 140 coacting with openings I and K and other legs (not shown) coacting with A and C in the base. While connected in a manner similar to that of FIG. 3 where the cables are running in a longitudinal direction, in the transverse view of FIG. 8, the cables must be of a smaller maximum diameter. Inside tabs which are not illustrated but would correspond to 53 and 55 are also in place and inoperative for the usage of FIG. 8.

Figure 9:
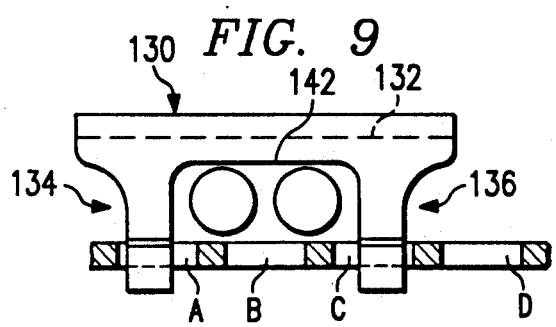
FIG. 9 illustrates a side view of the clamp of FIG. 6 using smaller diameter cables in a transverse direction as compared to the actual illustration of cables used in FIG. 6.

FIG. 9 illustrates using the lower clips or projections corresponding to projections 53 and 55 of FIG. 3 and illustrates that the same maximum diameter cables can be used in the transverse direction through a four-legged clip of FIG. 9 as shown in the longitudinal direction for FIG. 3 using the dimensions illustrated. However, the bit portion 142 between legs 134 and 136 could be made higher or lower to accommodate a fourth size for a given base thickness. In other words, the cable sizes illustrated in FIGS. 3, 6, 8 and 9, may all be different in diameter and still be snugly enclosed in a single layer depending upon the orientation of the cables and the use of inside or outside snap fit projections.

Figure 10:
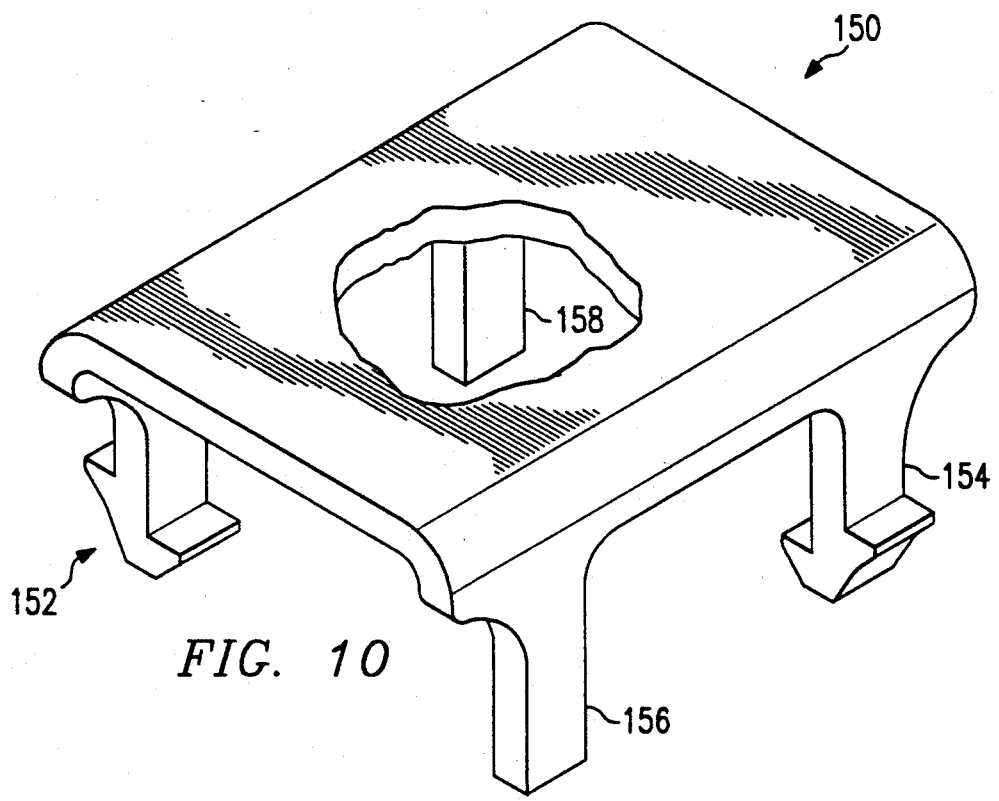
FIG. 10 is an isometric view of a modification of FIG. 7 showing that not all of the legs in the concept need to have the snap fit projections.

While FIG. 7 illustrates the inside and outside tabs on all the legs, FIG. 10 shows a clamp 150 having legs 152 and 154 configured as shown in FIG. 7 with the remaining legs 156 and 158 without the snap fit projections. Such a part would be somewhat easier to machine or mold and would be simpler to install and remove. Other modifications in the placement of the snap projections will also be apparent to those skilled in the art.

FIG. 11 illustrates a clamp 160 having a first set of cables 162 running in a longitudinal direction and a further set of cables 164 situated beneath cables 162 and running in a transverse direction. A bit portion 166 between legs 168 and 170 could well be used in the manner shown in FIG. 8 to contain cables 164 and similar size cables 162 may be contained in a manner similar to that shown in FIG. 4. Using the lower or inside projections, different size cables could be placed in the upper and lower positions such as the different cable sizes shown, transverse and lengthwise in FIGS. 9 and 4.

OPERATION

While the operation of the present inventive concept will be reasonably apparent to those skilled in the art of cable retainers from the Detailed Description given above, a summary explanation will be provided herein. If it is desired to use the clip of FIG. 1, cables are first laid down on a support having at least some openings or a grid of openings such as shown in FIG. 2. The legs of clip 10 may then be inserted in the openings that are on either side of the cable as laid down. If the cables are roughly the size of that shown in FIG. 3, the outside tabs 22 and 28 of FIG. 1 may be used in holes spaced corresponding to A and C to fasten the cables. If, on the other hand, the cables were somewhat larger such as shown in FIG. 6, the inside tabs 20 and 26 could be used on the adjacent edges of openings such as A and D to provide the cable retention feature. As also explained, by varying the thickness of the support, different size cables could be snugly retained such as shown in FIG. 4, where the support thickness is considerably greater than shown in FIG. 3. FIG. 4, however, uses the same tabs for retention as shown in FIG. 3.

If a four-leg clip such as shown in FIG. 7 is utilized, more options are available as to retaining cables in a snug one-layer of cables fit. As illustrated in FIGS. 3 and 6, two different size cables can be run in the longitudinal direction through the clip 95 of FIG. 7, and with appropriate dimensions between the retaining clips and the bit portion 107, two additional sizes could be run in the transverse direction through clip 95 between legs 103 and 105. FIGS. 8 and 9 show two different size cables run in this transverse direction, although, due to the dimensions of bit portion 107 relative the snap fit tabs on the legs, the cables of FIG. 9 are substantially identical with that of FIG. 3. The dimensions illustrated are in accordance with existing requirements for one embodiment of the inventive concept. However, it will be readily apparent to one skilled in the art how to make the clip of FIG. 7 provide a snug retention of four different size cables.

As mentioned previously, FIG. 10 illustrates that not all of the legs need the snap fit retention tabs assuming there is some reason for requiring space under certain openings, etc.

Although not illustrated, the concept includes the idea of having multiple snap projections on the inside and/or outside if more cable size snug fit retention capability is required.

As suggested previously and as illustrated in FIG. 11, the concept can be used to retain cables in at least two directions simultaneously with the bit portion 166 between legs 168 and 170 retaining the lower layer of cables 164 and the main bit portion of the retainer, and the tops of cables 164 providing a snug retention of the layer of cables 162. While the cables 162 and 164 are shown as being of the same diameter, the design of the clip can easily be such that they can be different diameters. Further, while the bit portion 166 is shown as providing a snug fit for cables 164, the main bit portion in combination with the snap tabs, can merely be used to provide a snug fit for the two layers of cables 162 and 164 with the bit portion 166 merely being used for structural integrity and stiffness of the retainer 160.

Although I have illustrated several embodiments of my inventive concept and have discussed others, it is apparent that further modifications will be realized by those skilled in the art. Therefore, I wish to be limited not by the information contained herein, but only by the scope of the appended claims wherein I claim.

I claim:

1. Cable holder apparatus comprising, in combination:
   U-shaped flexible material having a main bit portion with first and second side portions extending from said main bit portion for, as a first alternative, enclosing a cable oriented in a first direction with respect to the apparatus, the side portions each having surface projections for coaction with an opening in a base and said side portions having extremities extending a distance X from said main portion as viewed from an end of said U-shaped flexible material; and
   said side portions each having an opening therein, for, as a second alternative, enclosing a cable oriented in a direction orthogonal said first direction thereby defining two legs extending to the extremity of said portion which legs are shorter than the distance X as viewed from a side of said U-shaped flexible material.

2. The method of providing a multilevel cable clamping capability comprising the steps of:
   forming flexible material into a U-shaped clamp configuration having legs with different height inside and outside snap fit and hold projections;
   inserting the legs of said clamp into two support openings whose outside edges are spaced apart substantially the distance between said legs to hold cable of a first maximum diameter; and
   inserting the legs of said clamp into two support openings whose inside edges are spaced apart substantially the distance between said legs to hold cable of a second maximum diameter.

3. The method of providing a multilevel cable clamping capability comprising the steps of:
   forming flexible material into a U-shaped clamp configuration having at least 4 legs and at least 2 of said legs having snap fit and hold projections, said U-shaped clamp having legs of a first length as viewed from an end and having legs of a second length as viewed from a side;
   inserting the legs of said clamp into openings in a support to contain cable run in an end to end direction of a first maximum diameter; and
   inserting the legs of said clamp into openings in a support to contain cable run in a side to side direction of a second maximum diameter.

4. The method of clamping two orthogonally oriented layers of cable to a support comprising the steps of:
   positioning a bottom layer of cable on a support in a first direction between snap fit openings;
   positioning a top layer of cable on said support and over said bottom layer of cable in a second direction orthogonal said first direction between said snap fit openings;
   inserting a U-shaped snap fit clamp, having a first bit portion and two side portions with two legs on each side portion defining a further bit portion between the legs on each side, into said snap openings wherein said further bit portion between the legs of said side portions hold said bottom layer of cable and the first bit portion holds said top layer of cable.

5. Snap fit cable clamp apparatus comprising, in combination:
   U-shaped base bit having flexible side portions, where said side portions include snap fit projections, extending therefrom and defining a first distance X from an underside of said base bit to the extremities of said flexible side portions; and
   a U-shaped opening in each of said flexible side portions defining two legs and an enclosed auxiliary bit portion, the distance from said auxiliary bit portion to the extremities of said legs being less than said first distance X.

* * * * *